Patented Feb. 17, 1931

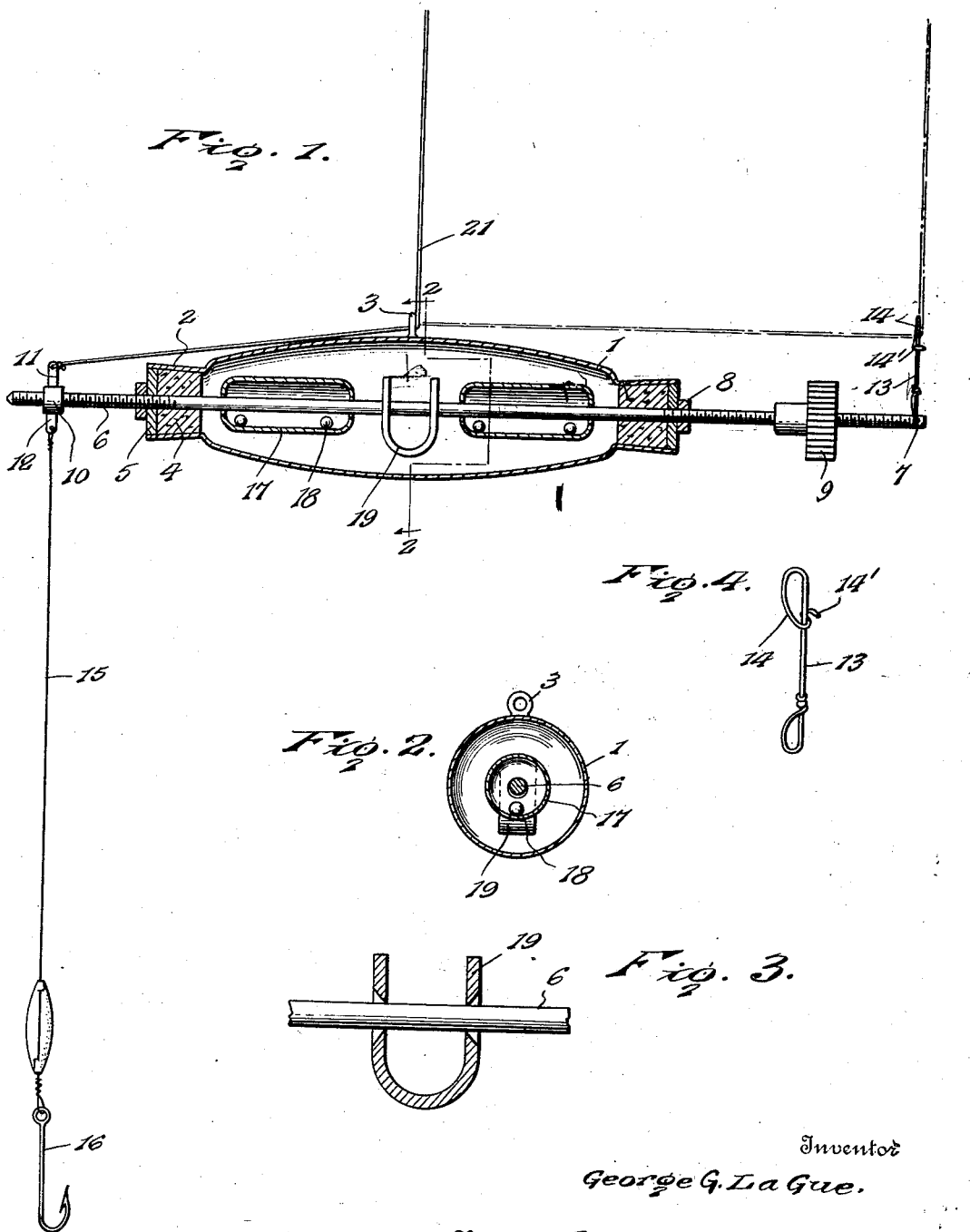

1,792,989

UNITED STATES PATENT OFFICE

GEORGE G. LA GUE, OF DUNNELL, MINNESOTA, ASSIGNOR OF ONE-TENTH TO OMER B. LA GUE, OF FOWLER, INDIANA

COMBINATION FLOAT AND FISH LURE

Application filed September 1, 1928. Serial No. 303,449.

This invention relates to a combination float and fish lure.

One object of the invention is to provide a float embodying means for producing a sound for transmission to a hook connected with the float.

Another object of the invention is to provide a fish luring device having means for producing sounds of different character.

A further object of the invention is to provide a fish luring device having means for adjusting the float to different operating positions.

Other objects of the invention not specifically mentioned in the foregoing will appear during the course of the following description.

In the drawing:

Figure 1 is a longitudinal sectional view of the device,

Figure 2 is a cross sectional view of the device on the line 2—2 of Figure 1 looking in the direction indicated by the arrows, Figure 3 is a fragmentary sectional view showing in detail the sound producing fork, Figure 4 is a fragmentary perspective view showing in detail the wire snell.

Referring more particularly to the drawing, the numeral 1 indicates a substantially cigar-shaped shell which is formed preferably of sheet metal and provided at each end with a tapered neck 2. Mounted on the wall of the shell is a medially disposed eye 3 and removably fitting tightly in the necks 2 are stoppers 4 formed preferably of cork. Overlying the outer end walls of the stoppers are washers 5 formed of hard rubber or other suitable material and providing further sealing means for the shell.

Extending axially through the stoppers and through the shell to project at each end thereof is a rod 6. The rod is formed preferably of brass and is provided at one end with an eye 7. Screwed on the rod at both ends thereof and abutting the washers 5 are nuts 8 for securing the stoppers 4 in firm position in the necks 2 and also securing the shell firmly on said rod. Screwed on the rod 6 at the rear end thereof is a balancing nut 9 formed preferably of lead, said nut being adjustable for varying the angle of the device when in the water. Screwed on the rod 6 at the forward portion thereof is a nut 10 having radial lugs 11 and 12 at opposite sides thereof.

Extending through the eye 7 of the shaft 6 is a preferably wire snell 13 which is secured at the eye and bent at its opposite end to form a spring loop 14, terminating in a hook 14' normally engaging the stem of the snell for closing the loop. However, the hook may be disengaged from the stem and a line slipped into the loop, thus obviating the necessity of threading the line through the loop.

Slidably mounted on the rod 6 within the shell 1 are sound producing drums 17 formed preferably of aluminum, and freely received in said drums are balls 18 providing means for producing a rumbling or rolling sound.

Slidably mounted on the rod 6 and disposed between the drums 17 is a substantially U-shaped sound producing fork 19 formed preferably of steel and provided with aligned cone-shaped openings in the side portions to receive the rod, the sharp edges of the metal at the small ends of said openings being disposed to impinge the rod to provide a scraping sound as the fork shifts. A similar scraping sound would, of course, be produced by the sliding of the drums 17 along the rod.

In use a fishing line 21 is passed through the eye 3 and is appropriately secured to the lug 11 when the device is ready to be placed in the water. If preferred, the line, as shown in dotted lines, may be passed through the loop 14 of the snell and thence through the eye 3 of the shell and attached to the lug 11. As will be clear, rocking motion imparted to the device by the rippling of the water will not only cause the balls to be shifted within the drums 17, but will also cause said drums, as well as the fork to be shifted longitudinally along the rod. Both a rumbling and scraping sound will be produced and, of course, the sound waves will travel through the rod, the nut, and the leader 15 to be communicated to the hook so that the fish will be attracted by the sound emanating from the hook. Experience has taught that in thus providing sounds at the hook, the fish are excited thereby and attracted to the bait. The biting of fish on the bait will, of course, tend to increase the sounds produced at the hook. By adjusting the nut 10 along the forward end of the rod, the leverage of the hook on the device may be varied as desired and when the nut is thus shifted, the nut 9 is also adjusted along the rear end portion of the rod so that the float will maintain a horizontal position in the water. However, if found advantageous, the nut may, of course, be adjusted to cause the float to assume any desired angle in the water.

Having thus described the invention, I claim:

1. A device of the character described including a float, and means carried thereby for producing a scraping sound.

2. In a fishing device, the combination of a float, and means carried thereby for producing a fish luring rumbling sound.

3. In a fishing device, the combination of means for producing a fish luring sound, means for transmitting the sound produced to a fish hook, and means housing said sound producing means.

4. A device of the character described including a shell, a rod extending through said shell, and a sound producing fork carried on the rod within the shell.

5. A device of the character described including a float having an eye, a rod extending through the float, a nut carried on the forward end portion of the rod and having means to accommodate a fishing line extending through said eye as well as to accommodate a hook carrying leader, said nut providing means for adjusting the leverage on the float of a hook carried by said leader, a nut carried on the rear end portion of the rod and adjustable to balance said first mentioned nut for maintaining the float in horizontal position when in the water, and sound producing means carried by the rod within the float.

6. In a fishing device, the combination of a float, means for connecting a hook therewith, and means carried by the float for producing fish luring sound vibrations for transmission to the hook.

7. In a fishing device, the combination of a float, means for connecting a hook with the float, and a drum within the float for producing fish luring sound vibrations for transmission to the hook.

8. In a fishing device, the combination of a float, means for connecting a hook with the float, a drum within the float, and means carried in the drum for producing fish luring sound vibrations for transmission to the hook.

In testimony whereof I affix my signature.

GEORGE G. LA GUE. [L. S.]